US012565968B2

(12) United States Patent
(10) Patent No.: US 12,565,968 B2
(45) Date of Patent: Mar. 3, 2026

Ghabchi et al.

(54) METHODS AND SYSTEMS FOR TANK WALL THERMAL INSULATION

(71) Applicant: Blue Origin Manufacturing, LLC, Hunstville, AL (US)

(72) Inventors: Arash Ghabchi, Bothell, WA (US); Mark Francis Wagner, Glendale, CA (US); Artem Alexander Dyakonov, Seattle, WA (US); Rachel Anne Clark, Seattle, WA (US); Gary D. Grayson, Maple Valley, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 90 days.

(21) Appl. No.: 18/490,135

(22) Filed: Oct. 19, 2023

(65) Prior Publication Data

US 2025/0129892 A1 Apr. 24, 2025

(51) Int. Cl.
*F17C 13/00* (2006.01)

(52) U.S. Cl.
CPC .... *F17C 13/001* (2013.01); *F17C 2201/0104* (2013.01); *F17C 2203/03* (2013.01)

(58) Field of Classification Search
CPC ............ F17C 2270/0197; F17C 13/001; F17C 2201/0104; F17C 2203/03
See application file for complete search history.

(56) References Cited

U.S. PATENT DOCUMENTS

| | | | | |
|---|---|---|---|---|
| 3,208,621 | A * | 9/1965 | Dawson | F17C 13/001 220/901 |
| 4,101,045 | A | 7/1978 | Roberts | |
| 5,269,247 | A | 12/1993 | Jean | |
| 6,003,283 | A * | 12/1999 | Hull | E04C 2/365 52/783.17 |
| 6,668,561 | B1 * | 12/2003 | Sheu | F17C 1/16 220/560.12 |
| 8,234,835 | B2 | 8/2012 | Dye et al. | |
| 9,335,003 | B2 * | 5/2016 | Shin | F17C 1/002 |
| 10,578,247 | B2 * | 3/2020 | Weisberg | F16L 9/19 |
| 2005/0042416 | A1 | 2/2005 | Blackmon et al. | |
| 2010/0001005 | A1 | 1/2010 | Chong | |
| 2014/0318629 | A1 | 10/2014 | Gieskes | |
| 2015/0292678 | A1 * | 10/2015 | Spittael | F17C 1/12 62/45.1 |

(Continued)

*Primary Examiner* — Shawn M Braden
(74) *Attorney, Agent, or Firm* — Summit Patents PC

(57) ABSTRACT

Techniques and materials provide for thermal insulation for tanks, such as tanks for use in space flight missions. Microporous glass blocks may be used as an insulative bridge between spray-on foam insulation and a stainless steel wall of a tank, for example. Blocks of microporous glass may be mechanically attached to the interior of the tank, after which spray-on foam insulation is applied directly to the blocks. The bridging insulation provided by the microporous glass blocks allows the temperature of the stainless steel tank wall to exceed the usable temperature of the spray-on foam insulation by preventing a substantial portion of heat of the stainless steel wall from reaching the spray-on foam insulation. An insulated tank may instead comprise a tank wall that is a honeycomb-structured composite layer including an exterior skin, an interior skin, and a core that presents a relatively long thermal path, for improved thermal insulation.

18 Claims, 3 Drawing Sheets

(56) References Cited

U.S. PATENT DOCUMENTS

| | | | |
|---|---|---|---|
| 2018/0339785 | A1 | 11/2018 | Waldrop, III et al. |
| 2019/0309905 | A1* | 10/2019 | Ishikawa ............... F17C 13/006 |
| 2021/0317950 | A1 | 10/2021 | Sassi |
| 2024/0255107 | A1 | 8/2024 | Chun |

* cited by examiner

METHODS AND SYSTEMS FOR TANK WALL THERMAL INSULATION

BACKGROUND

In space, long duration missions generally require a capability to store and maintain propellant throughout the mission. Cryogenic propellants, such as liquid oxygen and liquid hydrogen, are difficult to maintain due to heating in space, which causes these propellants to boil off. Moreover, storage tanks of such liquids may be subjected to extreme heat during a reentry phase of a mission.

Storage tanks may be insulated to protect contents from heat transfer into and out of the tanks. Unfortunately, there is a general tradeoff between weight and mass of insulation and the insulative value that it provides. There continues to be a demand for insulating techniques and materials that can be used for space flight missions, for which relatively light weight and low mass are very important design considerations.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
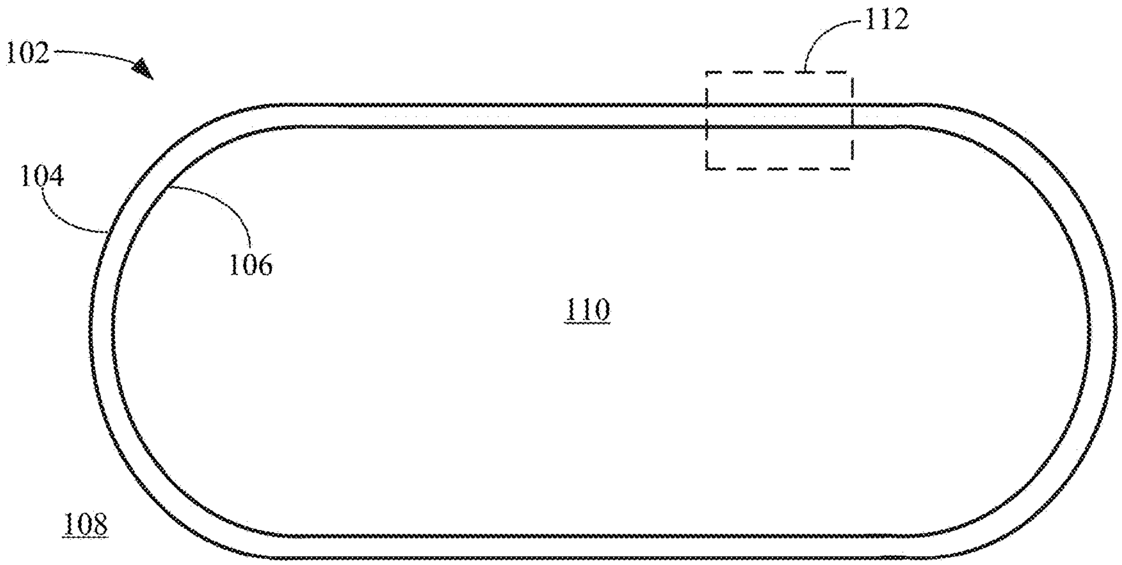
FIG. 1 is a cross-section view of an insulated tank, according to some embodiments.

This disclosure describes a number of techniques and materials for providing thermal insulation to tanks, such as tanks for use in space flight missions. For example, some embodiments involve microporous glass blocks, or other insulative material, used as an insulative bridge between spray-on foam insulation (SOFI) and the wall of a tank. In other embodiments, tank construction and insulation may involve a metallic honeycomb structure between outer and inner shells of the tank. Both the former and latter embodiments are described in detail below.

As just mentioned, some embodiments involve microporous glass blocks used as an insulative bridge between spray-on foam insulation (SOFI) and a wall of a tank, which may be stainless steel. Blocks of microporous glass may be mechanically attached to the interior of a tank. Afterward, the blocks of microporous glass may be covered by SOFI that is applied directly to the blocks. The bridging insulation provided by the microporous glass blocks allows the temperature of the exterior of the (e.g., stainless steel) tank wall to exceed the usable design temperature of the SOFI by preventing a substantial portion of heat of the exterior tank wall from reaching the SOFI. Thus, for use in a reusable spacecraft, such bridging insulation may prevent heat arising from reentry in earth's atmosphere from degrading or damaging tank insulation. Bridging insulation inside the tank may reduce or eliminate the need to place thermal protection systems on or adjacent to the outside of the tank.

As described in detail below, an insulated tank may comprise microporous glass blocks at least partially covering the interior surface of the tank, and spray-on foam insulation sprayed onto the microporous glass blocks. Standoffs may protrude from the interior surface of the tank to which the microporous glass blocks are mechanically attached. The standoffs may be low-heat-conductive plastic. In some implementations, standoffs may be metal, which detrimentally has a higher heat conductivity than plastic, but is stronger than plastic and can operate over a wider range of temperatures as compared to plastic. The higher heat conductivity of metal standoffs need not be a problem because the contact area of standoffs is relatively small. In some implementations, a liner may at least partially cover the spray-on foam insulation so as to prevent the spray-on foam insulation from directly contacting contents (e.g., gases or liquids) to be stored in the insulated tank.

Though glass blocks are used in embodiments described herein, other insulative materials and/or configurations could be used. For example, glass blocks are merely one example of a high-temperature insulation (e.g., for temperatures to and above 500 degrees Celsius). Other examples include low density ceramic tiles, rigidized carbon felt, low density glass-based tile, Saffil® blanket material, and so on.

In other insulated tank construction techniques, different than those involving glass blocks, for example, tank construction and insulation may involve a metallic honeycomb structure between outer and inner shells of the tank. Unfortunately, however, the honeycomb walls can act as thermal path shorts between hotter and colder shells of the tank, thus allowing a relatively high amount of heat transfer. Also, while the honeycomb structure provides high stiffness to the tank, the honeycomb walls add substantial weight to the tank wall system.

In embodiments described herein, a honeycomb structure, such as that described above, is replaced by a core design that substantially reduces thermal contact points between the core walls and the outer and inner walls. Also, path length for heat transfer is substantially increased to further reduce the effects of a thermal short. The core design also uses relatively little wall material so that mass of the core is relatively low, as described below.

As described in detail below, an insulated tank may comprise a honeycomb-structured composite layer that includes an exterior skin, an interior skin, and a core, which comprises structural elements that are repeated to form an array between the exterior and interior skins. The structural elements include upper sections, lower sections, and angular sections that interconnect the upper and lower sections. The upper sections are attached to the exterior skin and aligned in a direction parallel to the exterior and interior skins. Gaps, which may be filled with air or other gas, are between the upper sections and the interior skin. The lower sections, aligned in the same direction as that of the upper sections, are attached to the interior skin. Gaps, which may be filled with the air or other gas, are between the lower sections and the exterior skin. Pairs of contiguous angular sections are arranged in a chevron and connected to the upper sections at the apex of the chevron. The angular sections have a declination so as to connect the upper sections to the lower sections. Each of the two angular sections of a pair is aligned at substantially equal but opposite angles with respect to the first direction, as described below.

In some implementations, the exterior skin may be the outer (e.g., exterior) tank shell and the interior skin may be positioned to be exposed to the contents of the tank. The interior skin, adjacent to the contents of the tank, may have holes (e.g., porous or other openings) to let contents (e.g., a gaseous phase thereof) of the tank into the aforementioned gaps. In other implementations, these gaps may comprise a vacuum. In this case, the interior skin does not have holes and thus prevents the contents of the tank from reaching these gaps.

FIG. 1 is a cross-section view of an insulated tank 102, according to some embodiments. Tank 102 includes an exterior surface 104 and an interior surface 106. Exterior surface 104 is exposed to outside 108 the tank and interior surface 106 is exposed to contents 110 that may be stored in the tank. 112 delineates a portion of the tank wall, which includes the exterior and interior surfaces.

Figure 2:
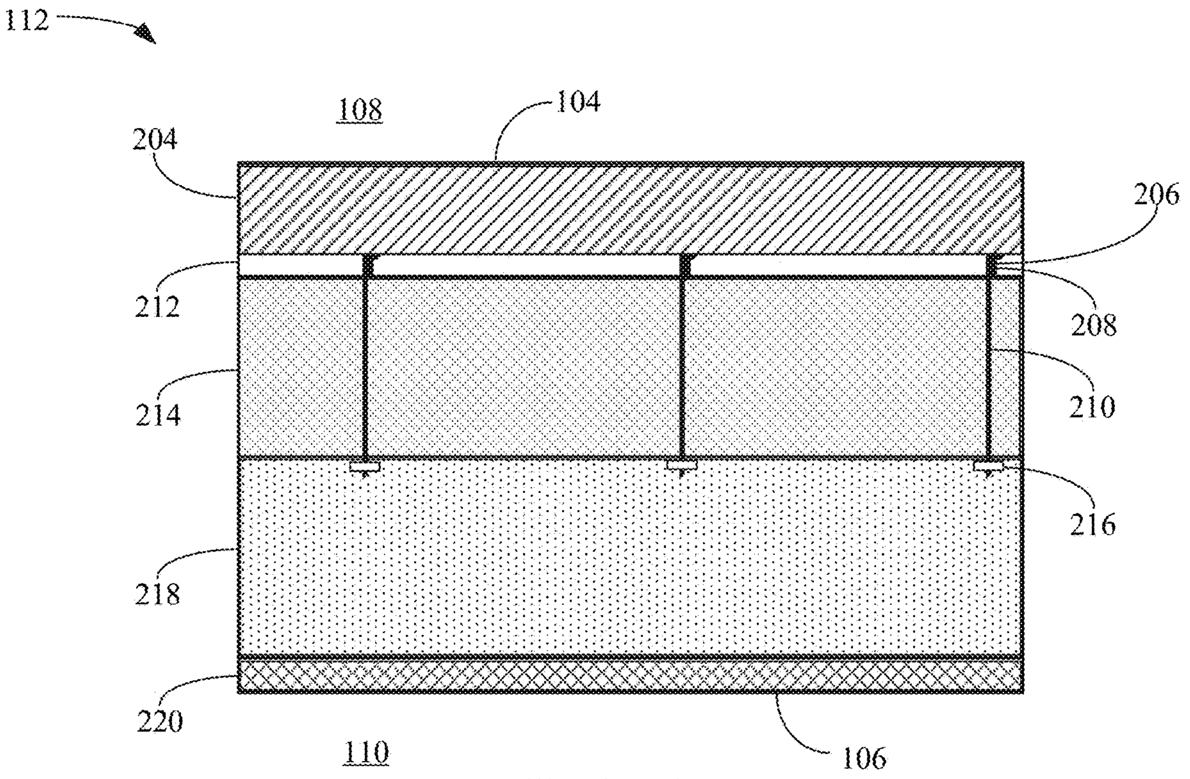
FIG. 2 is a close-up cross-section view of the wall of an insulated tank, according to some embodiments.

FIG. 2 is a close-up cross-section view of the portion 112, depicted in FIG. 1, of the wall of tank 102, according to some embodiments. A metallic tank shell 204 (e.g., an exterior shell), which may be steel, aluminum, titanium, Inconel®, or aluminum-lithium alloys, just to name a few examples, forms the outermost layer of the tank wall and includes exterior surface 104. Standoffs 206, which may have a mutual spacing of 12 inches or so, may be brazed or welded to the interior surface of shell 204 and protrude inward. A base portion 208 of the standoffs, nearest shell 204, may be wider or thicker than an extended portion 210 of standoff 206. The extra width of base portion 208 maintains a gap 212, as explained below, by preventing microporous glass blocks 214 from contacting the interior surface of shell 204.

Microporous glass blocks 214, which may include holes that align with standoffs 206, may be placed onto extended portions 210, which may be threaded at their distal portions, and retained in position by nuts 216 (e.g., and a washer), or other type of connector, so as to cover shell 204 and create gap 212. In various implementations, as mentioned above, base portions 208 of each standoff 206 prevent the microporous glass blocks from contacting shell 204 to create gap 212. Spray-on foam insulation 218, such as a polyurethane or polyimide, for example, may then be sprayed onto microporous glass blocks 214 (and nuts 216) so as to at least partially cover the microporous glass blocks (and the nuts). In some embodiments, a liner 220, which includes interior surface 106, may cover spray-on foam insulation 218 so as to prevent the spray-on foam insulation from contacting contents 110 stored in insulated tank 102. Though claimed subject matter is not limited to any particular material thickness, each of glass blocks 214 and spray-on foam insulation 218 may up to several inches thick.

In other implementations, not illustrated, instead of standoffs 206 that comprise extended portions 210, standoffs may comprise a threaded hole relatively close to shell 204 to receive a distal portion of a bolt (with a broad head) that extends through the microporous glass blocks. In this case, the microporous glass blocks have holes that are aligned with standoffs 206. The broad head of such a bolt would be located at a location similar to that of nut 216 in FIG. 2 (though nut 216 doesn't exist in this latter-described implementation). Claimed subject matter is not limited to any particular method of standoff/bolt attachment, and the above attachment implementations are merely examples.

As mentioned above, gap 212 may be filled with air or other gas, which forms a layer of thermal insulation. For example, standoffs 206, which occupy a very small surface area of shell 204, are the only relatively high conductive heat path across gap 212. In some implementations, standoffs 206 may be modified to change the height of gap 212. In some implementations, instead of being formed by base portions 208 of standoffs 206, gaps may be formed by protrusions from the microporous glass blocks (not illustrated). For example, the microporous glass blocks may include ridges or protruding regions that extend from a surface of the microporous glass blocks and are in contact with the interior surface of the tank so as to form a gap between the microporous glass blocks and the interior surface of the tank.

Figure 3:
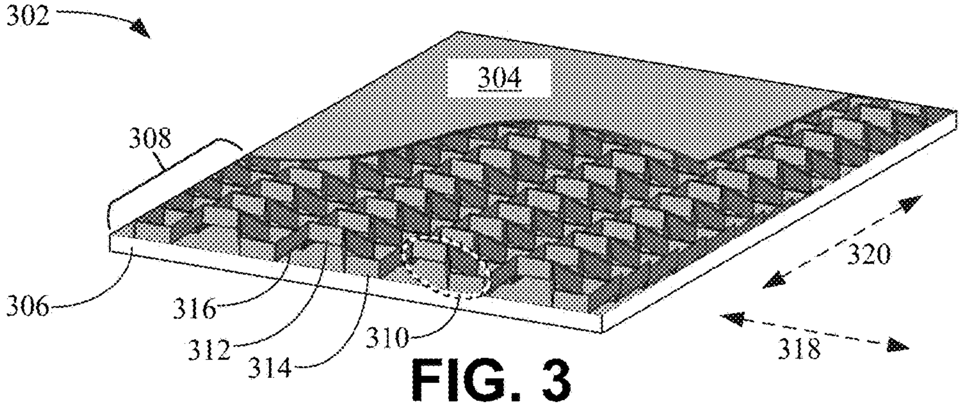
FIG. 3 is a perspective cutaway view of a portion of the wall of an insulated tank, according to some embodiments.
Figure 4:
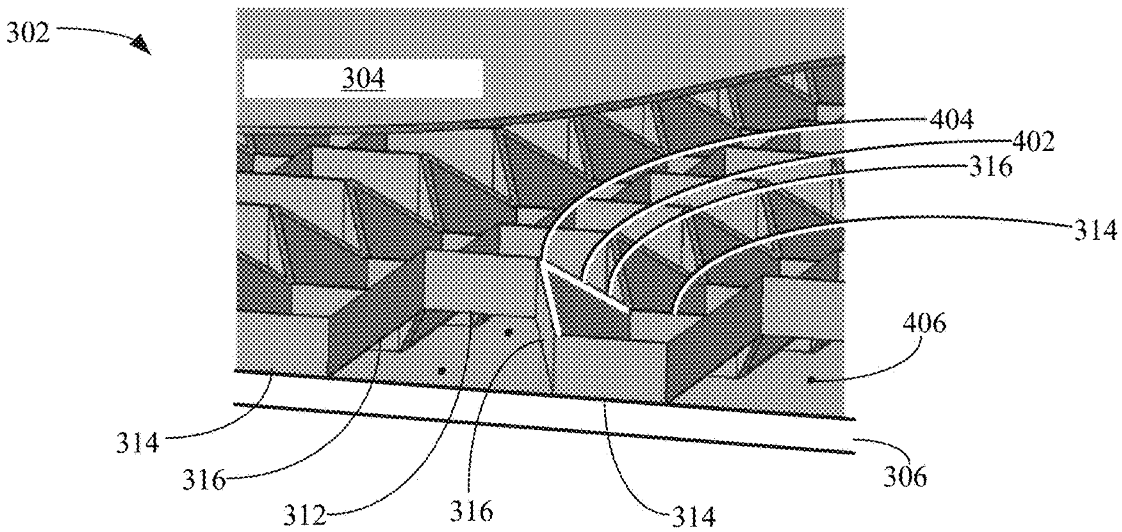
FIG. 4 is a close-up perspective cutaway view of a portion of an insulated tank, according to some embodiments.

FIG. 3 is a perspective cutaway view of a portion of a wall 302 (e.g., shell) of an insulated tank and FIG. 4 is a close-up perspective view, according to some embodiments. Wall 302 comprises a honeycomb-structured composite that includes an exterior skin 304, interior skin 306, and a core 308, which may be bonded to the skins with an adhesive, welding, or brazing, for example. Core 308 comprises a fundamental structural element that is repeated to form an array between the exterior and interior skins. The fundamental structural element includes one upper section 312, two angular sections 316 connected to the right side (as in FIGS. 3 and 4) of the upper section, two lower sections 314 respectively connected to the two angular sections, and two more angular sections 316 connected to the left side of the upper section. For sake of simplicity and clarity of the following descriptions, however, a "principle structural element", which is depicted as 310 in FIG. 3, is defined to be a portion of the fundamental structural element. Specifically, principle structural element 310 includes one upper section 312, a pair of lower sections 314, and two contiguous angular sections 316 that interconnect the upper and lower sections. Thus, the two angular sections 316 connected to the left side of upper section 312 are not included in principle structural element 310.

Herein, descriptions use "upper", "lower", and related directional words or phrases for convenience in explaining relative positions of various elements illustrated in the figures. Such words and phrases are not intended to have any relation to any particular external orientation, such as the direction of gravity, for example.

As introduced above, principle structural element 310 includes upper section 312, a pair of lower sections 314, and two angular sections 316 that interconnect the upper and lower sections. Upper section 312 is attached to exterior skin 304 and aligned in a direction 318 that is parallel to the exterior and interior skins. A gap (e.g., a space), which may be filled with air or other gas, as explained below, is between upper section 312 and interior skin 306. The pair of lower sections 314, each aligned in the same direction 318 as that of the upper section, are both attached to interior skin 306. A gap (e.g., a space), which may be filled with the air or other gas, is between the pair of lower sections 314 and exterior skin 304. The two angular sections 316 are arranged in a chevron 402, delineated in FIG. 4 for clarity, and connected to upper section 312 at the apex 404 of the chevron. Each of the two angular sections 316 has a declination so as to connect respectively to each of the pair of the lower sections 314. Each of the two angular sections 316 is aligned at substantially equal but opposite angles with respect to direction 318, as explained below.

Principle structural element 310 is repeated in direction 318 and a direction 324 that is orthogonal to direction 318, as illustrated in FIG. 3. This repetition occurs in a plane defined by directions 318 and 320 and between exterior skin 304 and interior skin 306. Dimensions and angles in the figures are not drawn to scale, and claimed subject matter is not so limited. For example, each of upper section 312, lower sections 314, and angular sections 316 are illustrated as having a height, described below, that is not necessarily drawn to scale relative to other dimensions.

In some implementations, exterior skin 304 may be an outer shell of the tank and interior skin 306 is positioned to be exposed to the contents of the tank. Interior skin 306, adjacent to the contents of the tank, may have holes 406 to let a gas phase of the contents of the tank into the aforementioned gaps. In other implementations, these gaps may comprise a vacuum. In this case, interior skin 306 does not have holes and thus prevents the contents of the tank from reaching these gaps.

Figure 5:
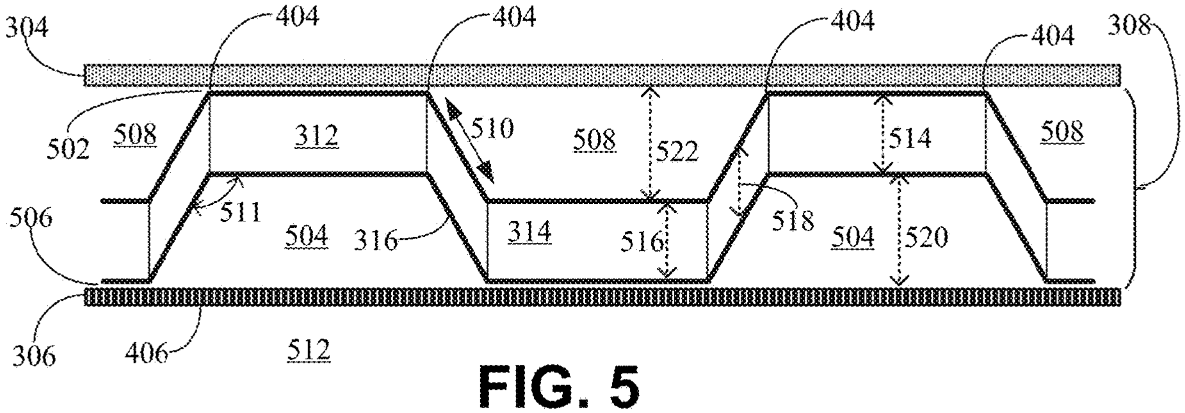
FIG. 5 is a schematic front view of the wall of an insulated tank, according to some embodiments.

FIG. 5 is a schematic front cutaway view of core 308 of wall 302, according to some embodiments. A portion of principle structural element 310 is illustrated and includes upper section 312, lower sections 314, and angular sections 316 that interconnect the upper and lower sections. Upper section 312 is attached to exterior skin 304 by welding, brazing, or gluing at an interlayer region 502. A gap 504, which is a space that may be filled with air or other gas, is between upper section 312 and interior skin 306. Lower sections 314, each aligned in the same direction as that of the upper section, are attached to interior skin 306 by welding, brazing, or gluing at an interlayer region 506. A gap 508, which is a space that may be filled with the air or other gas, is between lower sections 314 and exterior skin 304. Angular sections 316 (ones that are angled into the drawing are not illustrated) are connected to upper section 312 at apex 404 of chevron 402. Each of the angular sections 316 has a declination, indicated by arrow 510, so as to connect to each of the lower sections 314. Generally, there may be a tradeoff among an angle of declination 511, strength (e.g., compressive strength) of wall 302, and thermal conductance of angular sections 316. For example, increasing angle 511 may increase a thermal path length along angular sections 316, thus improving insulative properties of core 308. The increased angle, however, may decrease the compressive strength of wall 302 due to the changed structure of core 308.

Each of upper section 312, lower section 314, and angular section 316 may comprise the same or different materials. Materials may be metals having relatively low thermal conductivity. Exterior and interior skins 304 and 306 may also comprise the same or different materials. Metals of the exterior and interior skins and the upper, lower, and angular sections may be compatible with one another so as to be joined by welding or brazing. In one example embodiment, exterior skin 304 of a tank may comprise a metal selected for its relatively high strength and resistance to oxidation (e.g., stainless steel or aluminum), interior skin 306 may comprise a metal selected for its relatively high strength and resistance to chemical attach by contents to be stored in the tank, and upper, lower, and angular sections may comprise a material selected for its low thermal conductivity and relatively light weight.

Interior skin 306, adjacent to the contents 512 of the tank, may have holes 406 to let a gas phase of the contents of the tank into gaps 504 and 508, which are not isolated from each other. In other words, gas entering either of these gaps can flow uninhibited to the other gaps. In other implementations, gaps 504 and 508 may comprise a vacuum. In this case, interior skin 306 does not have holes 406 and thus prevents contents 512 of the tank from reaching these gaps.

In various embodiments, upper sections 312, lower sections 314, and angular sections 316 have a width in a direction that is orthogonal to the plane of core 308 (e.g., the plane of the exterior and exterior skins). For example, upper sections 312 have a width indicated by arrow 514, lower sections 314 have a width indicated by arrow 516, and angular sections 316 have a width indicated by arrow 518. Different embodiments may have different widths, and widths of the various sections need not be equal to one another. Generally, there is a tradeoff between increasing these widths for the sake of increasing the strength of core 308 and weight and thermal conduction, both desired to be relatively low. In some embodiments, weight may be reduced with relatively low impact on strength of core 308 by modifying the shape of upper and lower sections 312 and 314, as described below.

As mentioned above, gap 504 is the space between upper section 312 and interior skin 306. Accordingly, as the width (e.g., 514) of the upper section changes, so does the vertical height, indicated by arrow 520. Gap 508 is the space between lower sections 314 and exterior skin 304. Accordingly, as the width (e.g., 516) of the lower section changes, so does the vertical height, indicated by arrow 522.

As described above, core 308 of wall 302 include the structure and materials that are attached and between exterior and interior skins 304 and 306. For example, the structure includes angular sections 316 that present a relatively long thermal path length, as compared to the vertically oriented structures of a honeycomb configuration, for heat transfer from exterior skin 304 to interior skin 306 (or vice versa). The structure, which includes the array of principle structural elements 310, may also provide structural stability and a mass reduction compared to a honeycomb configuration. Such structural stability may also tolerate stress and strain that can be induced due to in-service temperature difference between hot and cold external and internal skins.

In addition to descriptions above for embodiments illustrated in FIGS. 3-7, for example, an alternative description for these and other embodiments recites gaps and bridge structures, as follows.

An insulated tank comprises a composite tank wall that includes an exterior skin (e.g., 304), an interior skin (e.g., 306), and a core (e.g., 308). The core may comprise an upper bridge structure, which may include, referring to FIG. 5, upper section 312 and angular sections 316. The upper bridge structure may have an upper edge (e.g., including apexes 404) adjacent to exterior skin 304. The upper bridge structure may also have a lower edge (e.g., the horizontal line between 312 and 504 in FIG. 5) that is elevated over a lower gap (e.g., 504). The core may also comprise an inverted bridge structure, which may include lower section 314 and angular sections 316. The inverted bridge structure may have a lower edge adjacent to interlayer region 506 and interior skin 306. The inverted bridge structure may also have an upper edge adjacent to an upper gap (e.g., 508) that is between the inverted bridge structure and the exterior skin.

Figure 7:
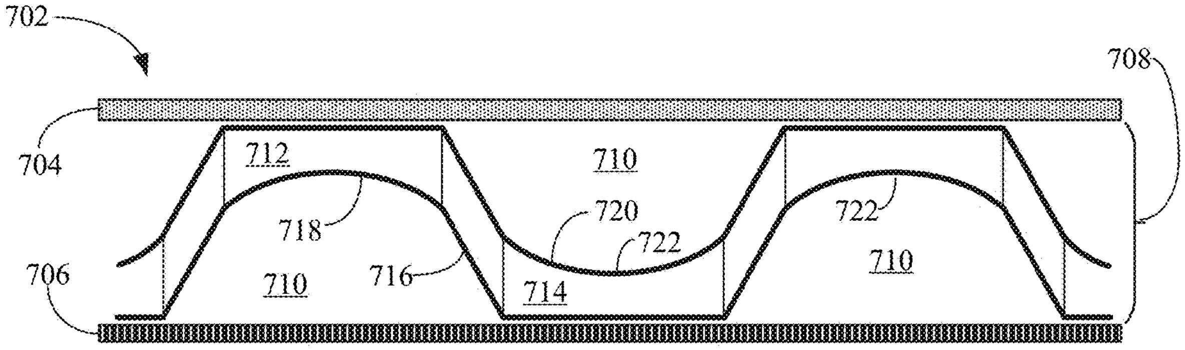
FIG. 7 is a schematic front view of the wall of an insulated tank, according to some embodiments.

In some implementations, each of the upper bridge structure and the inverted bridge structure extend perpendicularly from the exterior and interior skins, respectively. For example, upper section 312 of the upper bridge structure extends perpendicularly from exterior skin 304 and lower section 314 of the inverted bridge structure extends perpendicularly from interior skin 306. As illustrated in FIG. 3, occurrences of each of the upper bridge structure and the inverted bridge structure may repeat in a direction parallel to the exterior and interior skins. Also, occurrences of the upper bridge structure may repeat consecutively in a first direction parallel to the exterior and interior skins and occurrences of the upper bridge structure and the inverted bridge structure may alternately repeat in a second direction that is perpendicular to the first direction and parallel to the exterior and interior skins. In some implementations, as illustrated in FIG. 7 and described below, the lower edge that is elevated over the lower gap and the upper edge adjacent to the upper gap may each have an arch shape.

Embodiments described above may be implemented for a hydrogen tank wall that can experience heat input in a reentry environment. As mentioned above, internal skin 306, being in contact with the liquid hydrogen, may be perforated (e.g., holes 406) so that hydrogen may be in a gas phase between the internal and external skins 304 and 306 (e.g., in gaps 504 and 508). The gaseous hydrogen may consequently contribute to insulating the internal skin from the hotter external skin. In embodiments where internal skin 306 is not perforated (e.g., does not include holes), there may be a vacuum between the internal and external skins 304 and 306 (e.g., in gaps 504 and 508), which can eliminate convective heat transfer.

Figure 6:
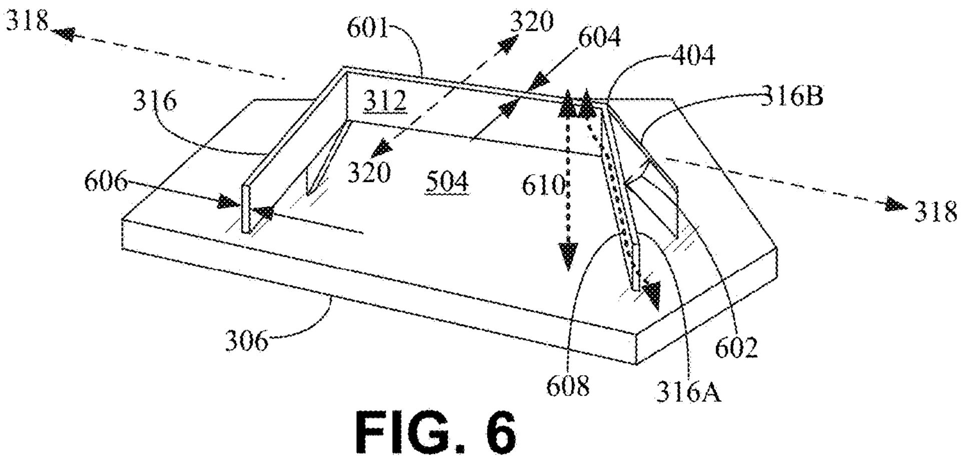
FIG. 6 is a schematic perspective view of a portion of the wall of an insulated tank, according to some embodiments.

FIG. 6 is a schematic perspective view of a portion of core 308 of an insulated tank, according to some embodiments. In particular, FIG. 6 illustrates a schematic representation of upper section 312 and angular sections 316 (lower sections 314 are not illustrated) that are disposed on internal skin 306 (or external skin 304, because of the symmetry of the principle structural elements, as described above). Edge 601 of upper section 312 is brazed, welded, or adhered to external skin 304. Gap 504 is between upper section 312 and interior skin 306. The two angular sections 316, further identified as 316A and 316B in FIG. 6, are arranged in a chevron and connected to upper section 312 at apex 404 of the chevron. Each of the angular sections 316 has a declination so as to connect respectively to each lower sections (e.g., 314). Each of the two contiguous angular sections 316A and 316B is aligned at substantially equal but opposite angles with respect to direction 318. For example, if angular section 316A is aligned at a positive angle "theta" with respect to direction 318, then angular section 316B is aligned at a negative angle "theta" with respect to direction 318. The angle at which angular section 316A and angular section 316B diverge from each other is indicated by 602. These angles, as illustrated in FIGS. 3-6, are merely examples, and claimed subject matter is not limited in this respect.

Upper section 312 has a thickness 604 that may be the same as or different from a thickness 606 of angular sections 316 and the thickness of the lower sections. Generally, there is a tradeoff between increasing these thicknesses for the sake of increasing the strength of core 308 and weight and thermal conduction, both desired to be relatively low. For example, thickness 604 may range from about 0.5 inches to 2 inches, though claimed subject matter is not so limited.

As described above, core 308 may be formed by repeated occurrences of the upper sections, angular sections, and lower sections in direction 318 and direction 320.

FIG. 6 also illustrates a comparison between thermal conduction of core 308 and that of a honeycomb structure, for example. Thermal conduction of core 308 may be primarily determined by thermal path length 608, depicted by a dashed arrow, that traverses a portion of upper section 312, angular sections 316, and a portion of lower section 314 (not illustrated in FIG. 6). All other things being equal, a longer thermal path length leads to increased thermal resistance, which is desired for increasing the value of thermal insulation of wall 302. Thus, increasing a length of angular sections 316 and/or increasing a declination angle 511, may improve thermal insulative properties of core 308, though mass and/or strength of core 308 may also be affected. Dashed arrow 610 depicts the relatively shorter thermal path length of an example honeycomb structure, which also may have more contact area with exterior and interior skins. Both these features of a honeycomb structure may lead to a decreased value of thermal insulation as compared to, for the same mass and strength, a structure such as core 308.

FIG. 7 is a schematic front cut-away view of a wall 702, according to some embodiments. Wall 702 and its components are similar to or the same as that of wall 302 described above, except that upper sections and lower sections of the core (e.g., 308) have a shape that is different from that of 312 and 314. In particular, wall 702 includes an exterior skin 704, and interior skin 706, and a core 708, which comprises gaps 710, upper section 712, lower sections 714, and angular sections 716 that interconnect the upper and lower sections. Upper section 712 is attached to exterior skin 704 by welding, brazing, or gluing at an interlayer region (e.g., 502). Gaps 710, which comprise a space of core 708 not occupied by upper, lower, and angular sections, may be filled with air, other gas, or in a vacuum.

Upper section 712 has a curved lower edge 718, which may form an arch (e.g., an arch shape). Similarly, lower section 714 has a curved upper edge 720, which may form an arch. Such a shape of the upper and lower sections may allow for a reduced mass of core 708 while retaining sufficient strength. Also, the volume of gaps 710 may increase so as to increase the thermal insulative property of core 708. The arch shape in this embodiment is merely an example, and claimed subject matter is not so limited. In other embodiments, the arch shape may be replaced with another shape or outline that results in a reduced area of the upper and/or lower sections and a resulting reduced mass of core 708. For example, another shape may be one that renders a width of the upper and/or lower sections to be smaller midspan 722 as compared to widths nearer the ends of the sections (e.g., where the angular sections connect).

Figure 8:
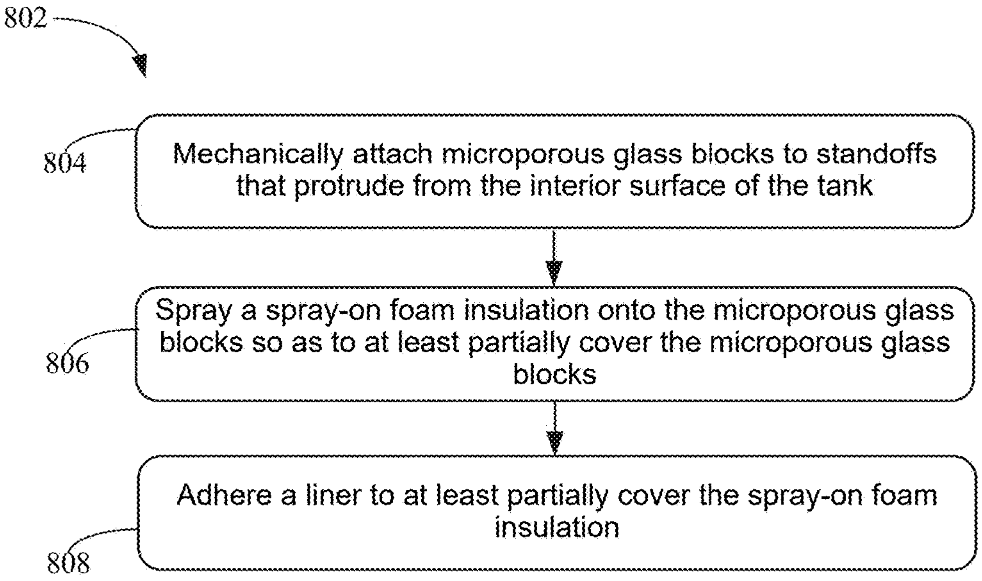
FIG. 8 is a flow diagram of a process for fabricating insulating layers of an insulated tank, according to some embodiments.

FIG. 8 is a flow diagram of a process 802 for fabricating insulating layers of an insulated tank, such as 102, according to some embodiments. Process 802 may be performed by a fabricator, for example. At 804, a fabricator may mechanically attach microporous glass blocks, such as 214, to standoffs (e.g., 206) that protrude from the interior surface of the tank. The standoffs may be brazed or welded to the inner surface of the tank. The standoffs may have a physical feature that desirably prevents the microporous glass blocks from contacting the inner surface of the tank, thus creating a gap (e.g., 212). Such a gap may be filled with air or other gas and may act as a layer of thermal insulation.

At 806, the fabricator may spray a spray-on foam insulation, such as 218, onto the microporous glass blocks so as to at least partially cover the microporous glass blocks. At 808, the fabricator may adhere a liner, such as 220, to at least partially cover the spray-on foam insulation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

We claim as follows:

1. An insulated tank for containing a fluid, the insulated tank comprising:

a composite tank wall that includes an exterior skin, an interior skin, and a core, wherein the core comprises:

an upper bridge structure having an upper edge adjacent to the exterior skin and a lower edge elevated over a lower gap that is between the upper bridge structure and the interior skin; and an inverted bridge structure having a lower edge adjacent to the interior skin and an upper edge adjacent to an upper gap that is between the inverted bridge structure and the exterior skin, wherein the upper gap and the lower gap are configured to contain a vacuum or gas that is isolated from the fluid contained by the insulated tank.

2. The insulated tank of claim 1, wherein the exterior skin is an outside surface of the insulated tank.

3. The insulated tank of claim 1, wherein the interior skin is an inside surface of the insulated tank and is configured to be exposed to the fluid.

4. The insulated tank of claim 3, wherein the interior skin is porous or has holes to allow the fluid into the lower and upper gaps.

5. The insulated tank of claim 1, wherein the exterior skin and the interior skin are each attached to the core by welding or brazing.

6. The insulated tank of claim 1, wherein each of the upper bridge structure and the inverted bridge structure extend perpendicularly from the exterior and interior skins, respectively.

7. The insulated tank of claim 1, wherein occurrences of each of the upper bridge structure and the inverted bridge structure repeat in a direction parallel to the exterior and interior skins.

8. The insulated tank of claim 1, wherein the lower edge elevated over the lower gap and the upper edge adjacent to the upper gap each have an arch shape.

9. The insulated tank of claim 1, wherein occurrences of the upper bridge structure repeats consecutively in a first direction parallel to the exterior and interior skins and occurrences of the upper bridge structure and the inverted bridge structure alternately repeat in a second direction that is perpendicular to the first direction and parallel to the exterior and interior skins.

10. An insulated tank comprising:

a honeycomb-structured composite wall that includes an exterior skin, an interior skin, and a core, wherein the core comprises:

an upper section attached to the exterior skin, wherein the upper section is aligned in a first direction parallel to the exterior and interior skins;

a lower gap between the upper section and the interior skin;

a pair of lower sections attached to the interior skin, wherein each of the pair of the lower sections is aligned in the first direction;

an upper gap between the pair of the lower sections and the exterior skin; and two contiguous angular sections arranged in a chevron and connected to the upper section at the apex of the chevron, each of the two contiguous angular sections having a declination so as to connect respectively to each of the pair of the lower sections, wherein each of the two contiguous angular sections is aligned at substantially equal but opposite angles with respect to the first direction.

11. An insulated tank comprising:

a tank wall including an exterior skin, an interior skin, and a core disposed between the exterior and interior skins;

wherein the core comprises a plurality of structural elements, including:

an upper section connected to the exterior skin;

a pair of lower sections connected to the interior skin; and a pair of angular sections that extend from the upper section and connect to respective ones of the lower sections, wherein each of the angular sections forms a chevron shape and is aligned at substantially equal but opposite angles relative to a direction parallel to the exterior and interior skins.

12. The insulated tank of claim 11, wherein the structural elements repeat in a first direction parallel to the exterior and interior skins.

13. The insulated tank of claim 11, wherein the structural elements repeat in a second direction orthogonal to the first direction and parallel to the exterior and interior skins.

14. The insulated tank of claim 11, wherein each of the upper and lower sections is aligned parallel to the exterior and interior skins.

15. The insulated tank of claim 11, wherein the exterior skin is configured to be exposed to an external environment and the interior skin is configured to be exposed to contents of the tank.

16. The insulated tank of claim 11, wherein each angular section is joined to the upper and lower sections at a junction that is brazed, welded, or adhesively bonded.

17. The insulated tank of claim 11, wherein a gap is present between each upper section and the interior skin and between each lower section and the exterior skin.

18. The insulated tank of claim 11, wherein the upper section is connected to a first pair of angular sections on one side and a second pair of angular sections on an opposite side.

* * * * *